(12) United States Patent
Hoogestraat

(10) Patent No.: US 11,220,406 B2
(45) Date of Patent: *Jan. 11, 2022

(54) BIN SWEEP WITH WEIGHT-SENSITIVE LINK

(71) Applicant: Sudenga Industries, Inc., George, IA (US)

(72) Inventor: Alan G. Hoogestraat, George, IA (US)

(73) Assignee: Sudenga Industries, Inc., George, IA (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/402,564

(22) Filed: May 3, 2019

(65) Prior Publication Data

US 2019/0256305 A1 Aug. 22, 2019

Related U.S. Application Data

(63) Continuation of application No. 15/484,495, filed on Apr. 11, 2017, now Pat. No. 10,322,892, which is a continuation of application No. 13/453,699, filed on Apr. 23, 2012, now Pat. No. 9,650,217.

(60) Provisional application No. 61/478,094, filed on Apr. 22, 2011.

(51) Int. Cl.
  *B65G 65/46* (2006.01)

(52) U.S. Cl.
  CPC ............ *B65G 65/466* (2013.01); *B65G 65/46* (2013.01)

(58) Field of Classification Search
  CPC ............................... B65G 65/46; B65G 65/466
  See application file for complete search history.

(56) References Cited

U.S. PATENT DOCUMENTS 9,650,217 B1 * 5/2017 Hoogestraat ........... B65G 65/46

* cited by examiner

*Primary Examiner* — Saul Rodriguez
*Assistant Examiner* — Ashley K Romano
(74) *Attorney, Agent, or Firm* — Mai-Tram D. Lauer; Westman, Champlin & Koehler, P.A.

(57) ABSTRACT

The disclosure describes an apparatus including a bin sweep arm, a floor support in contact with a floor surface, and a vertical adjustment assembly positioned between floor support and the bin sweep arm and connected to the floor support and the bin sweep arm, wherein the vertical adjustment assembly automatically raises the bin sweep arm off the floor surface and automatically lowers the bin sweep arm to the floor surface in response to changes in weight disposed on the bin sweep arm.

16 Claims, 13 Drawing Sheets

BIN SWEEP WITH WEIGHT-SENSITIVE LINK

CROSS REFERENCE TO RELATED APPLICATION

This application is a continuation of U.S. patent application Ser. No. 15/484,495, filed Apr. 11, 2017; which is a continuation of U.S. patent application Ser. No. 13/453,699, filed Apr. 23, 2012; which claimes the benefit of priority from U.S. Provisional Patent Application Serial No. 61/478,094, filed Apr. 22, 2011, entitled "Bin Sweep with Weight-sensitive Link;" these applications are hereby incorporated by reference in their entireties.

BACKGROUND

This disclosure relates to bin sweeps for moving and clearing grain and other stored materials from silos, grain bins and similar storage units. Specifically, this invention relates to a weight-sensitive link that connects an auger section of the bin sweep to a tractor drive unit or other floor support.

A grain bin sweep is generally found at the bottom of a grain bin having a flat floor. Typically, the grain bin has a circular horizontal cross-section. Diameters of grain bins vary from several feet to over one hundred feet. A bin sweep typically covers at least a portion of the radius of the bin, so that it sweeps a circular area of the bin as it rotates about an axis in the center of the grain bin.

To remove the stored material from a grain bin, a central opening at the bottom of the grain bin is opened to allow the grain to flow through by gravity. The grain flows like a viscous fluid much like the sand in an hourglass. Grain will flow into the floor opening until flow from gravity stops, leaving grain at the sides of the bin resting at an angle of repose. Additional openings spaced linearly from the center opening to the wall are opened, forming a trench-like valley. This allows access into the bin through a bin access door and removes the majority of the grain covering the bin sweep. The grain remaining in the bin must be removed. The bin sweep in a grain bin conveys the remaining grain or other stored material to the central floor opening.

A bin sweep typically includes a sweep arm having an auger that rotates about a horizontal axis for conveying grain that is lying on the floor of the grain bin toward the central floor opening or sump. The auger of the bin sweep extends radially outward from the center of the bin and is mounted adjacent to the central opening, usually through a connection that allows the bin sweep to pivot around an axis at the central floor opening. The bin sweep conveys grain toward the central floor opening as it gradually travels on an angular path within the grain bin. In some cases, the sweep is lengthened on subsequent passes to reach the circumference of the bin, eventually traveling over the entire floor surface of the grain bin.

A power source such as an electric or hydraulic motor is mounted to the central structure for supplying rotational power to the auger. Additionally, a driving means is typically used with the bin sweep for propelling the auger section about the central opening in the floor. The sweep drive mechanisms commonly include wheels or a track drive that will establish traction on the floor of the grain bin and is sometimes referred to as a tractor drive unit.

Present bin sweeps require an operator to enter the bin and lower the bin sweep onto the floor or place portions of the bin sweep (e.g., its support frame) on blocking before filling the bin with grain or other stored material. When supported by the floor or blocking, components of the bin sweep (such as the wheels, axles, connective brackets, etc.) are less likely to be damaged by the weight the stored material bearing down upon the bin sweep. Without such preventive measures, the floor support wheels of the bin sweep may indent into the floor, the wheels may permanently deform, or other structural damage may result.

However, after a bulk of the storage material has been removed, the bin sweep must be engaged to convey the remaining grain toward the center floor opening. To move relative to the floor surface, the bin sweep must be placed in an operating position, (i.e., be raised to provide a clearance between the floor surface and the rotating auger). A typical clearance between a back stop of a bin sweep and the floor is approximately one inch to two inches. Such clearance may be increased in particular locations due to floor unevenness. Consequently, the operator needs to enter the bin after some but not all of the grain has been drawn through the gravity outlets in order to raise the bin sweep into the operating position (such as by actuating a jack) or remove the blocking. This entry exposes the operator to possible grain engulfment.

SUMMARY

In one aspect, the disclosure describes an apparatus comprising a bin sweep arm, a floor support in contact with a floor surface, and a vertical adjustment assembly positioned between floor support and the bin sweep arm and connected to the floor support and the bin sweep arm, wherein the vertical adjustment assembly automatically raises the bin sweep arm off the floor surface and automatically lowers the bin sweep arm to the floor surface in response to changes in weight disposed on the bin sweep arm.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
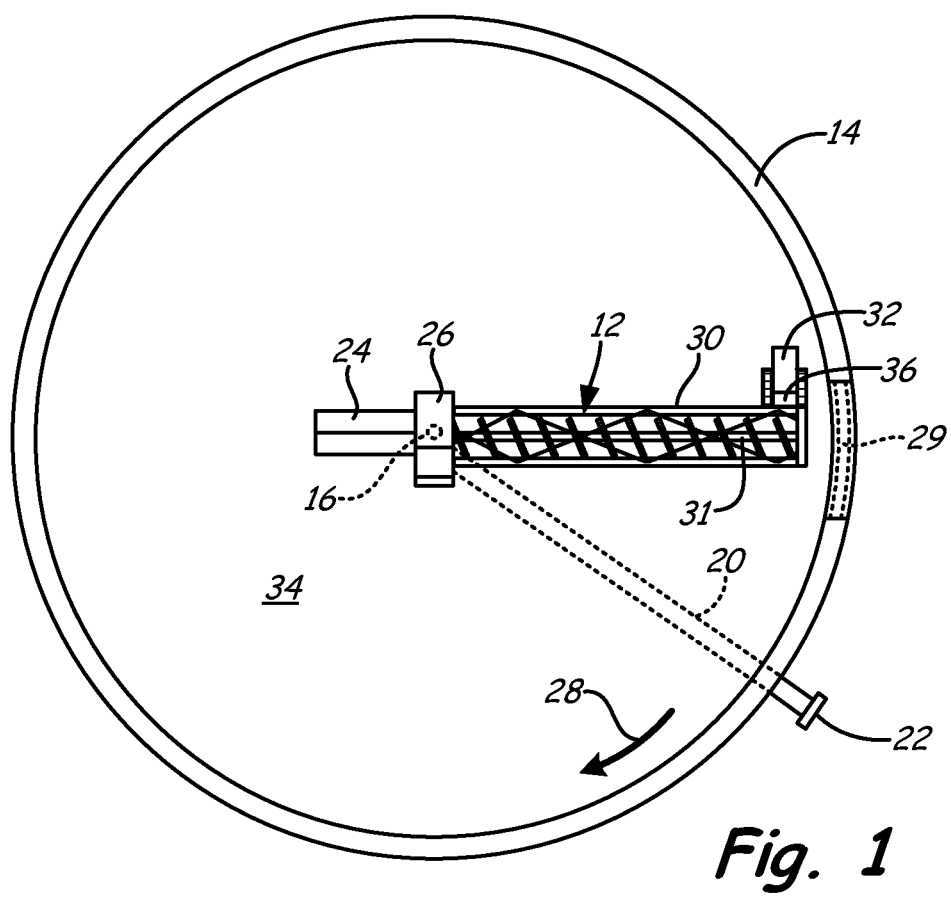
FIG. 1 is a top view of a bin sweep within a bin.

This disclosure describes a vertical adjustment assembly or mechanism for raising and lowering a bin sweep arm without requiring entry into the grain bin by an operator. FIG. 1 shows a top view of a bin sweep 12 as it would appear in use in grain bin 14. Grain bin 14 is a storage facility that is typically cylindrical with a generally flat floor surface 34, as is well known within the art. While FIG. 1 shows a single bin sweep arm 30 extending from a center of grain bin 14 to the periphery thereof, it is to be understood that a sweep operation may use multiple passes of the bin sweep arm, wherein each pass uses a sweep arm of increasing length.

Figure 2:
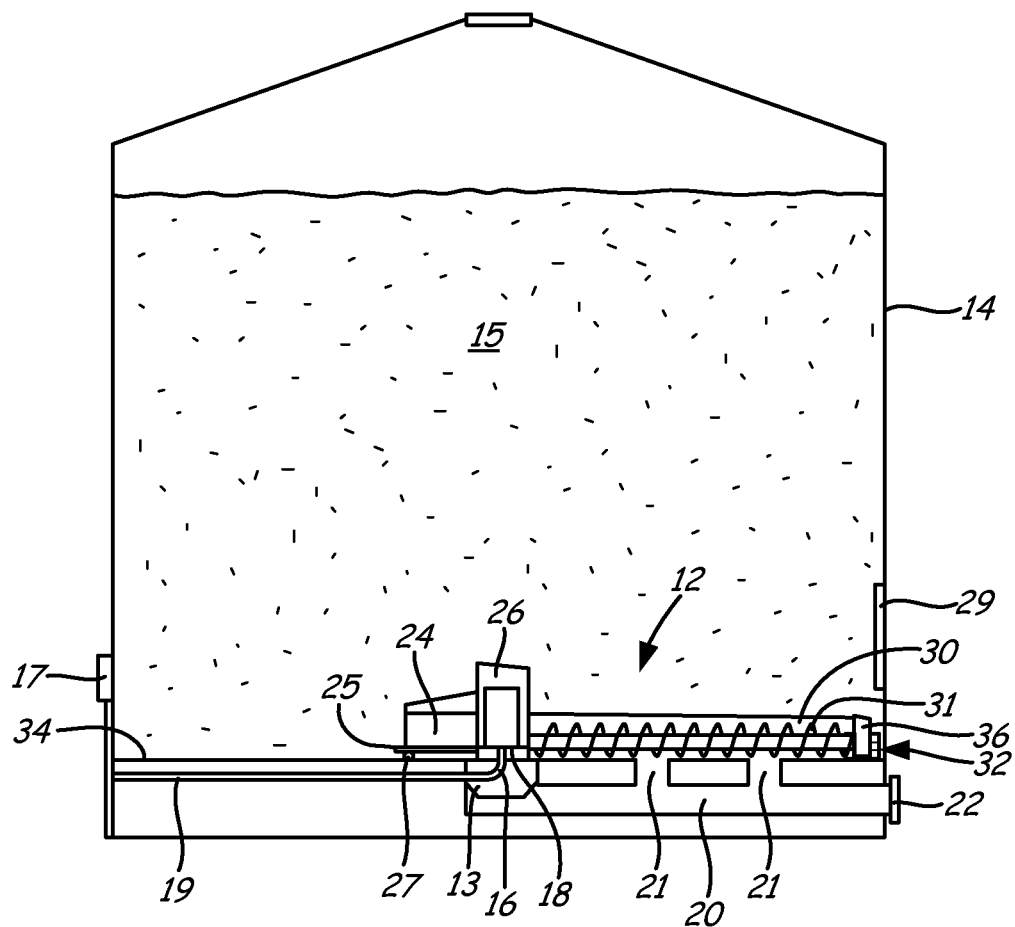
FIG. 2 is a sectional elevation view of a bin sweep within a bin filled with stored material, wherein the bin sweep is resting on the floor.
Figure 3A:
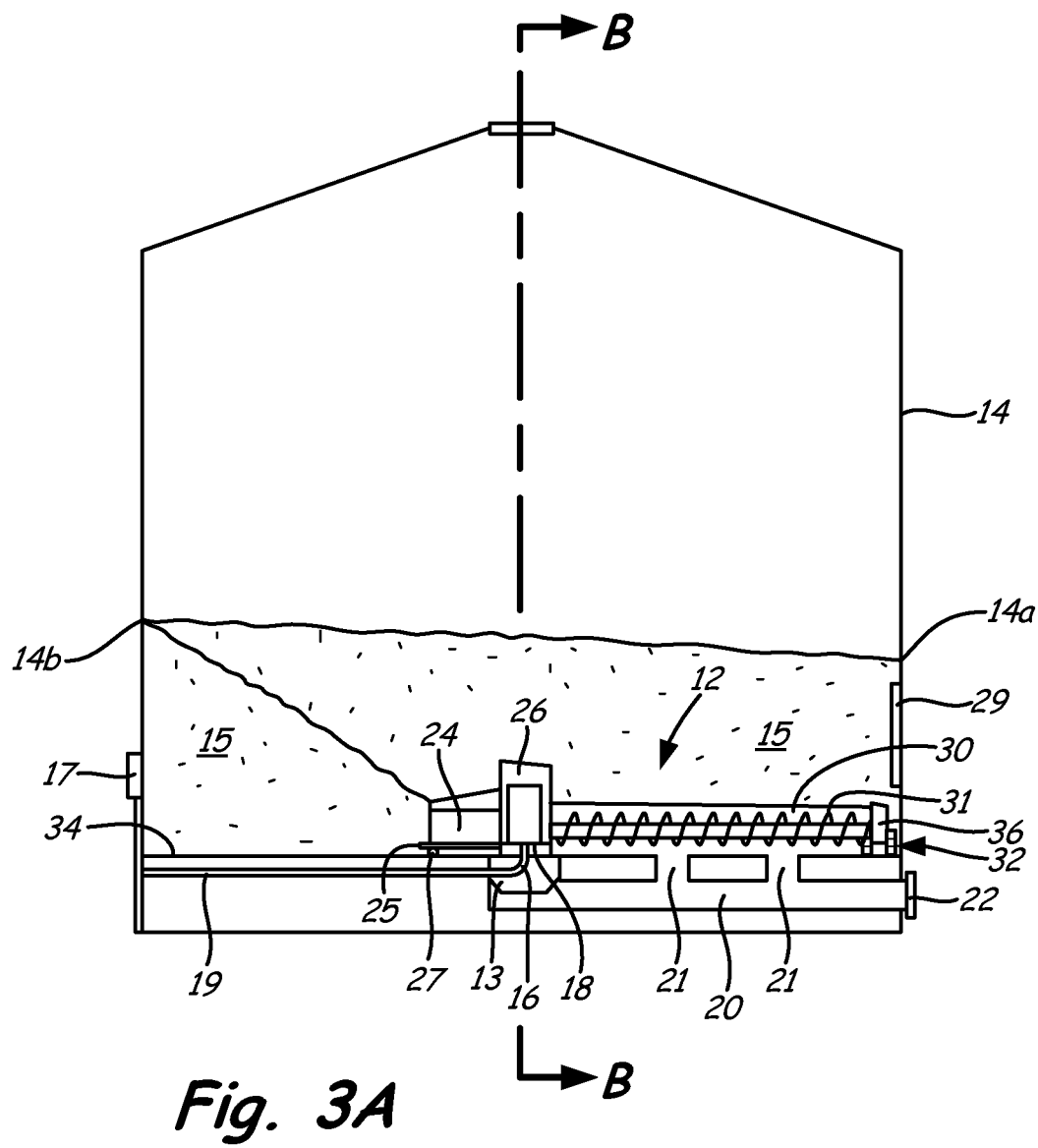
FIG. 3A is a sectional elevation view of a bin sweep within a bin partially emptied of stored material, wherein the bin sweep is raised off the floor.
Figure 3B:
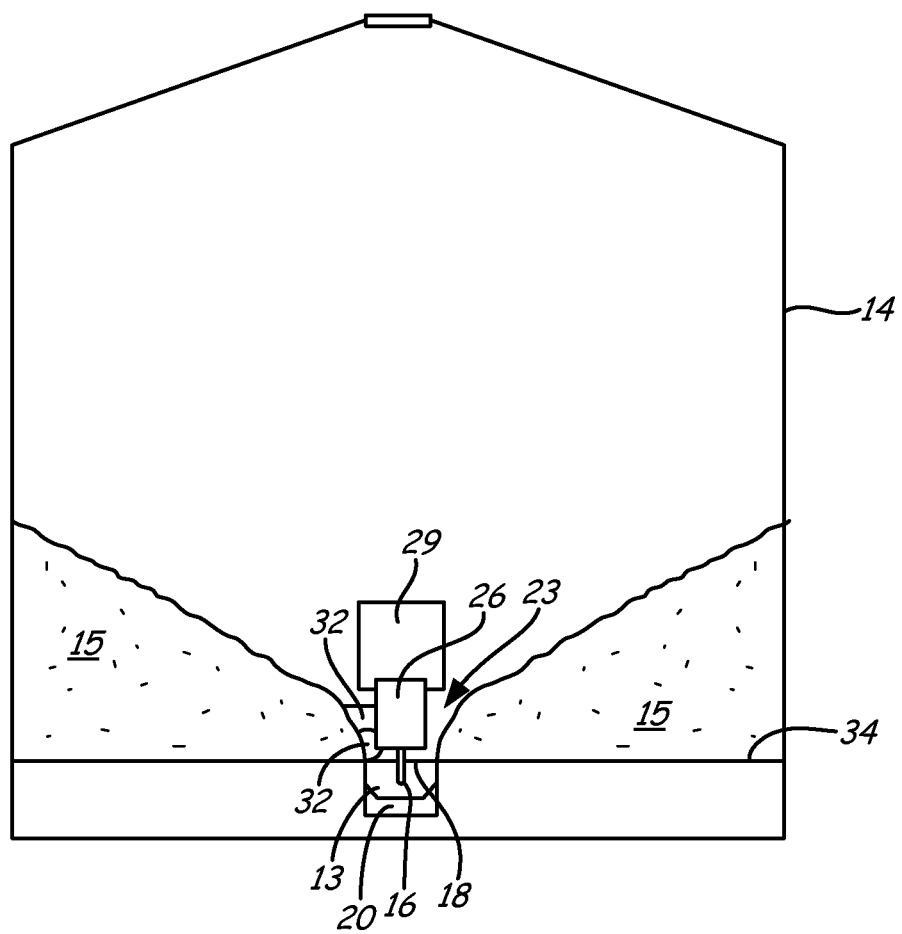
FIG. 3B is a sectional elevation view of a bin, taken along line B-B of FIG. 3A.

FIG. 2 is a sectional elevation view that shows grain bin 14 substantially full of stored material 15. In this case, portions of bin sweep 12 (e.g., bin sweep arm 30) are lowered completely to the floor surface 34 to prevent damage to the bin sweep 12 from the weight of the stored material 15 upon bin sweep 12. A door to floor opening 18 is opened to allow some of the stored material 15 to drain into center sump hopper 13 for removal by conveyor 20 through discharge opening 22. As illustrated in FIGS. 3A and 3B, part of the stored material 15 has been emptied to a point where the stored material 15 has come to rest at an angle of repose relative to the wall of the grain bin and its floor openings. As seen in FIG. 3A, additional floor openings 21 are provided in a line from central floor opening 18 toward a periphery of grain bin 14. As seen in FIG. 3B, additional floor openings 21 allow grain to flow directly onto conveyor 20, thereby forming a trench-like valley 23 in the stored material 15. This valley allows access into the bin through bin access door 29.

At this point of unloading grain bin 14, bin sweep 12 is engaged so that arm 30 of conveyor 31 may convey the stored material 15 from the outer edges 14a and 14b of grain bin 14 toward floor opening 18. In one embodiment, conveyor 31 is comprised of a central rod or pipe with a sized helical flighting attached thereto in the form of an auger, as is common in the art (and shown), although any linear conveyor apparatus may suffice for this purpose. The length of the conveyor 31 is nominally that of the radius of grain bin 14. In the form of an auger, conveyor 31 turns about a generally horizontal axis to convey stored material 15 from outer edges 14a and 14b to floor opening 18, which leads to center sump hopper 13. Depending on the length of sweep arm 30, support or carrier wheels (not shown) may be provided in intermediate positions on sweep arm 30 between collector ring housing 26 and tractor drive unit 32. Suitable constructions of bin sweep 12 are disclosed in commonly assigned U.S. Patent Application Publication 2005/0254922 and U.S. Pat. No. 8,864,433 which are hereby incorporated by reference.

Also shown in FIGS. 2 and 3, control panel 17 is connected to bin sweep 12 by a power line 19. Power line 19 in an exemplary embodiment is an electrical line that has been tapped into an electrical utility service providing power to the location of grain bin 14. The control panel 17 contains basic electrical components for running the bin sweep 12. In one embodiment, the power line 19 extends from the control panel 17 to the collector ring (not visible) inside the collector ring housing 26 to the motors of an auger drive unit 24 and tractor drive unit 32. In another embodiment, the power line 19 is a flexible cable leading from the control panel 17, through an access door in the bin wall to the motors of an auger drive unit 24 and tractor drive unit 32. Other embodiments are possible and obvious to those skilled in the art. Drive unit 24 activates conveyor 31; tractor drive unit 32 advances sweep arm 30 around the bin 14 in direction 28, as depicted in FIG. 1.

In one embodiment, bin sweep 12 has a conveyor drive unit 24 connected at a first end thereof. Dolly 25 supports drive unit 24 above floor opening 18. Casters 27 on the dolly 25 permit rotational movement about pivot axis 16. A collector ring housing 26 is positioned at central pivot axis 16 and connects drive unit 24 to sweep arm 30. Details on the use and structure of collector ring housing 26 are described in U.S. Pat. No. 8,616,823, which is hereby incorporated by reference. Drive unit 24 comprises a motor encased in a protective motor cover assembly. The motor in an exemplary embodiment is an electric motor operably connected to power line 19 that allows for control of the motor from the exterior of grain bin 14. When conveyor 31 is in the form of an auger, the motor provides power to turn the auger about a generally horizontal axis as the bin sweep 12 moves through the grain bin 14.

Figure 4:
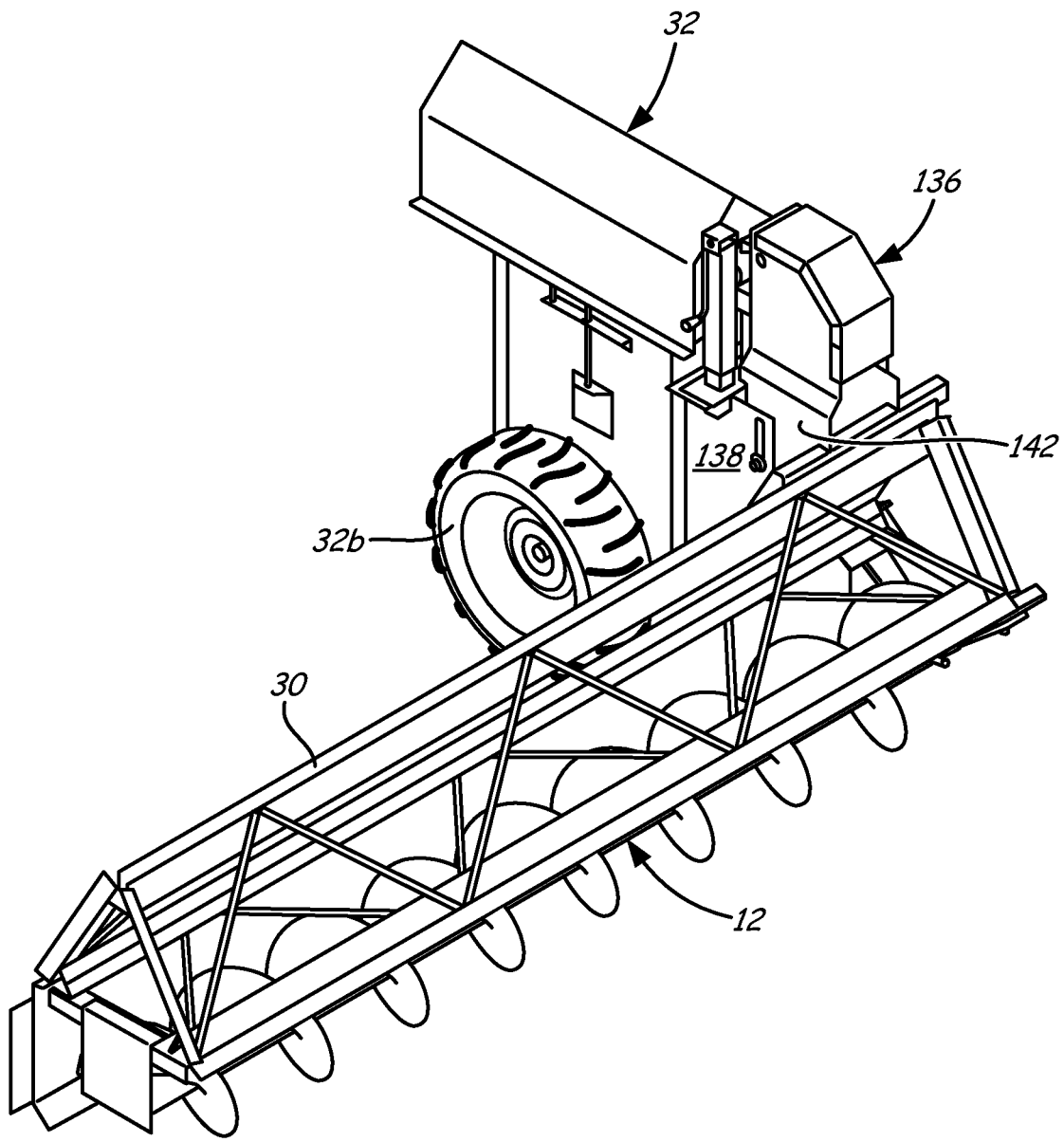
FIG. 4 is a front perspective view of an exemplary hydraulic weight-sensitive link connecting a bin sweep section to a tractor drive unit.
Figure 5:
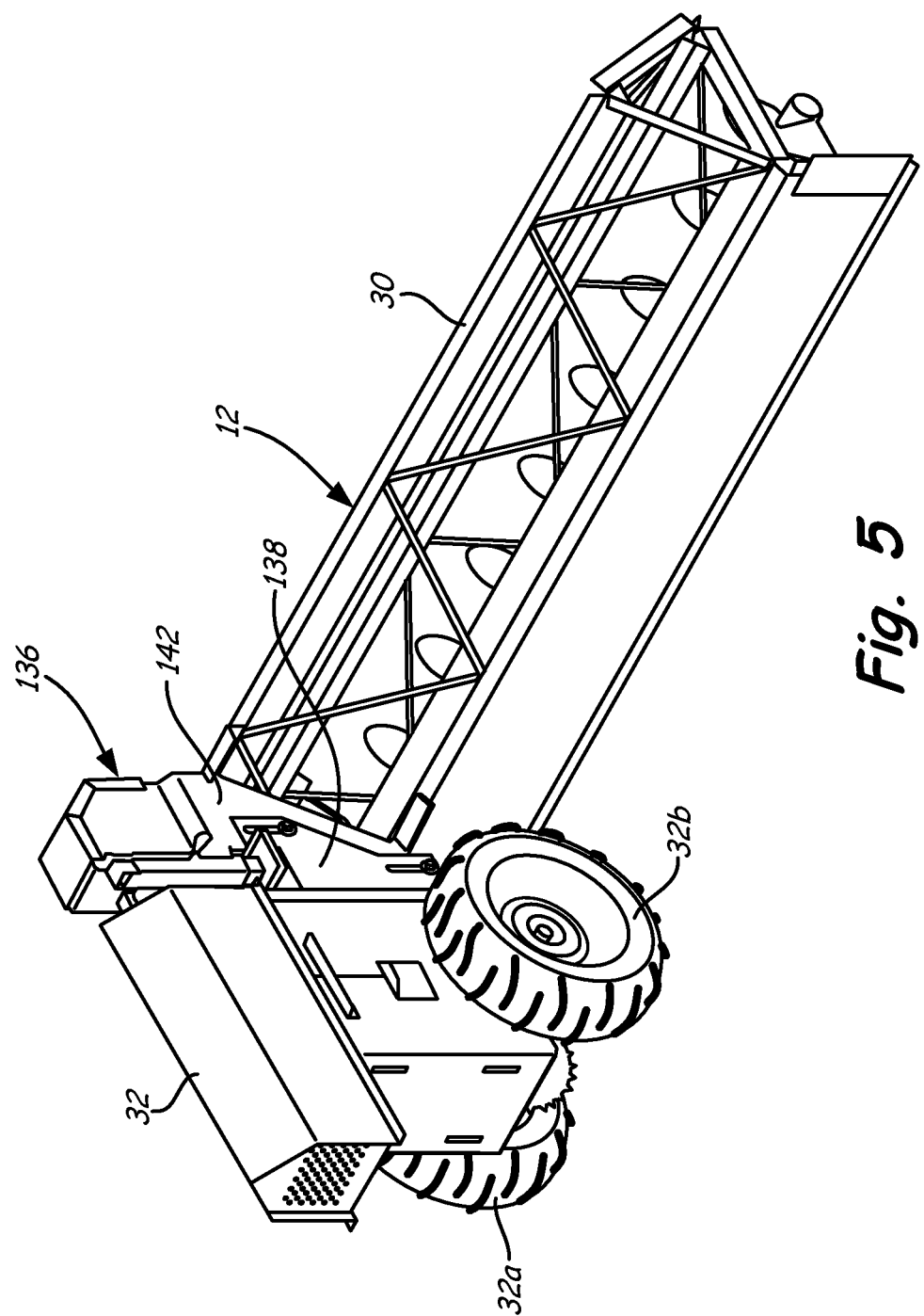
FIG. 5 is a rear perspective view of an exemplary hydraulic weight-sensitive link connecting a bin sweep section to a tractor drive unit.
Figure 6:
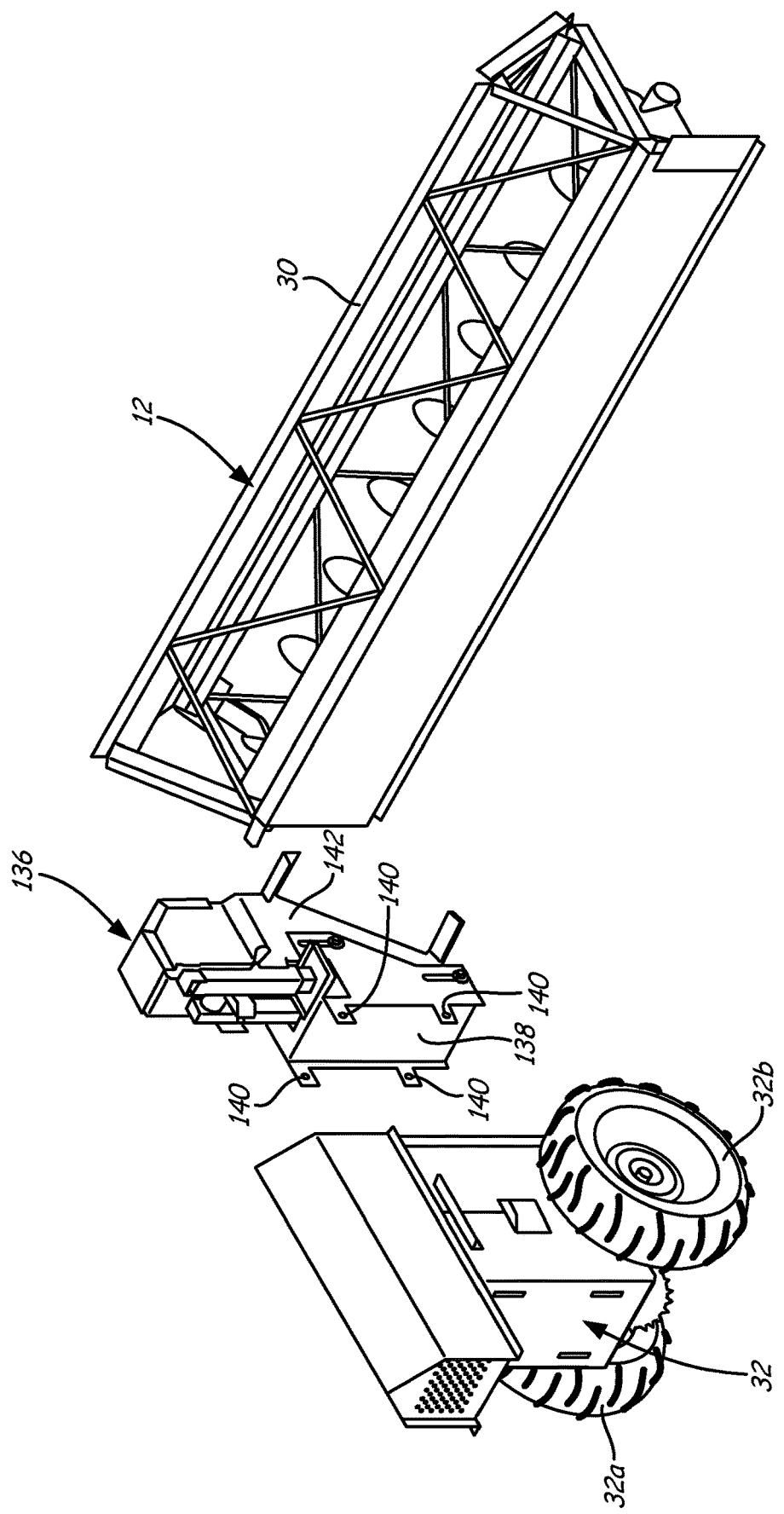
FIG. 6 is an exploded view of the components shown in FIG. 5.
Figure 7:
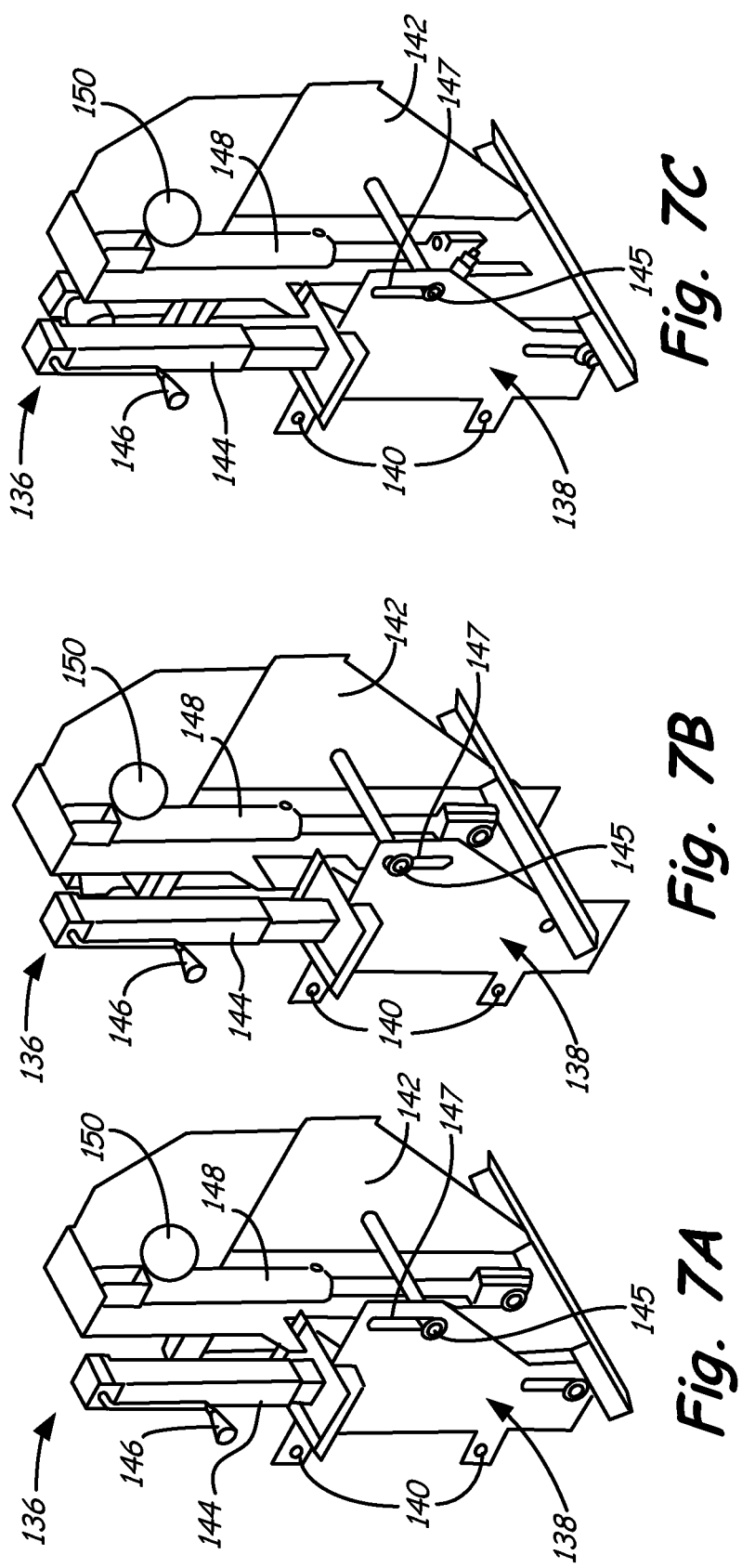
FIG. 7A is a front perspective view an exemplary hydraulic weight-sensitive link, wherein a jack is retracted so that the connected bin sweep arm would be on the floor.
FIG. 7B shows the hydraulic weight-sensitive link of FIG. 7A with the jack extended so that a connected bin sweep arm would be raised above the floor.
FIG. 7C shows the hydraulic weight-sensitive link of FIG. 7A, wherein a connected bin sweep arm would be automatically lowered to the floor by a hydraulic cylinder connected to a pre-charged accumulator.
Figure 9:
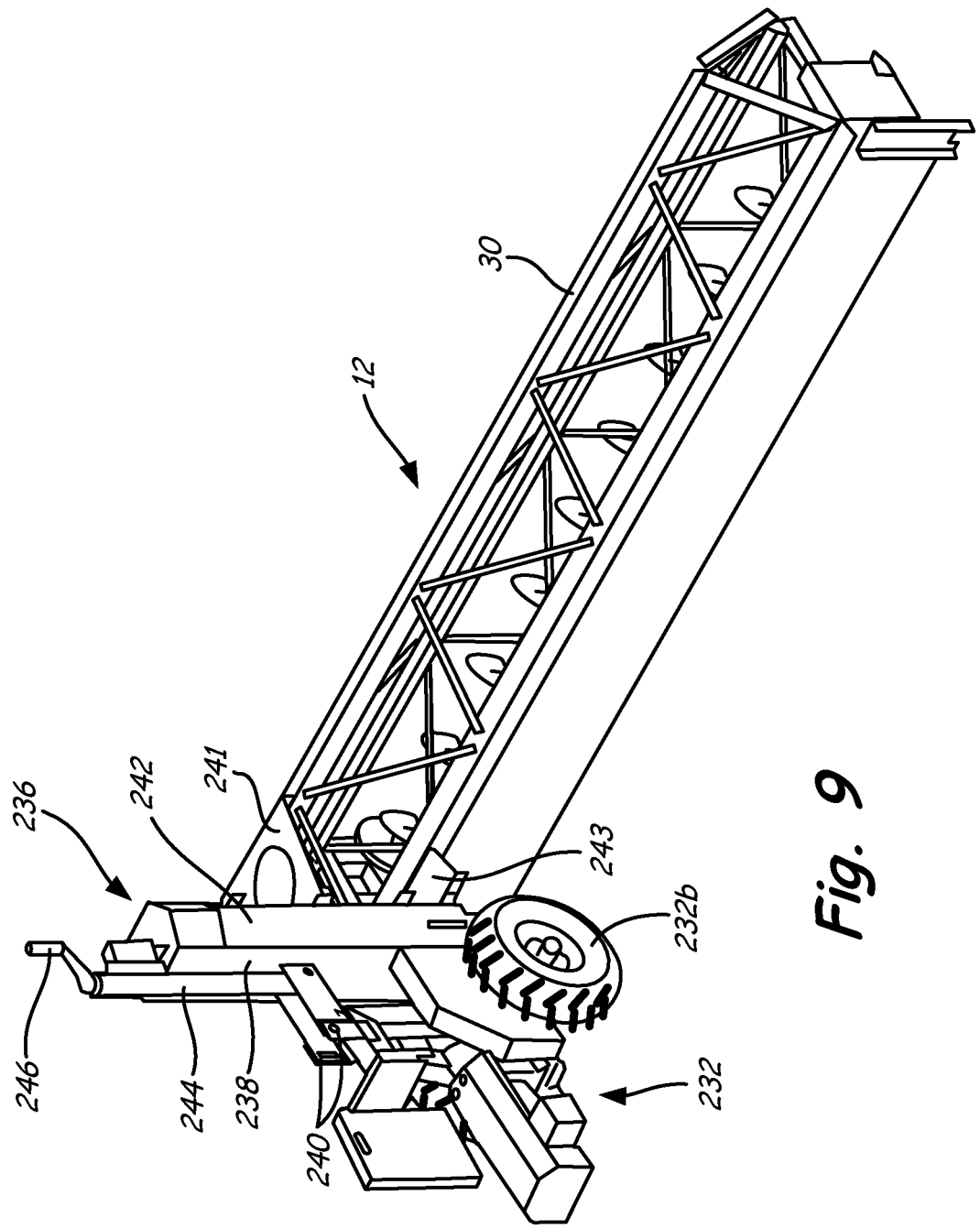
FIG. 9 is a rear perspective view of an exemplary spring-loaded weight-sensitive link connecting a bin sweep section to a tractor drive unit.
Figure 10:
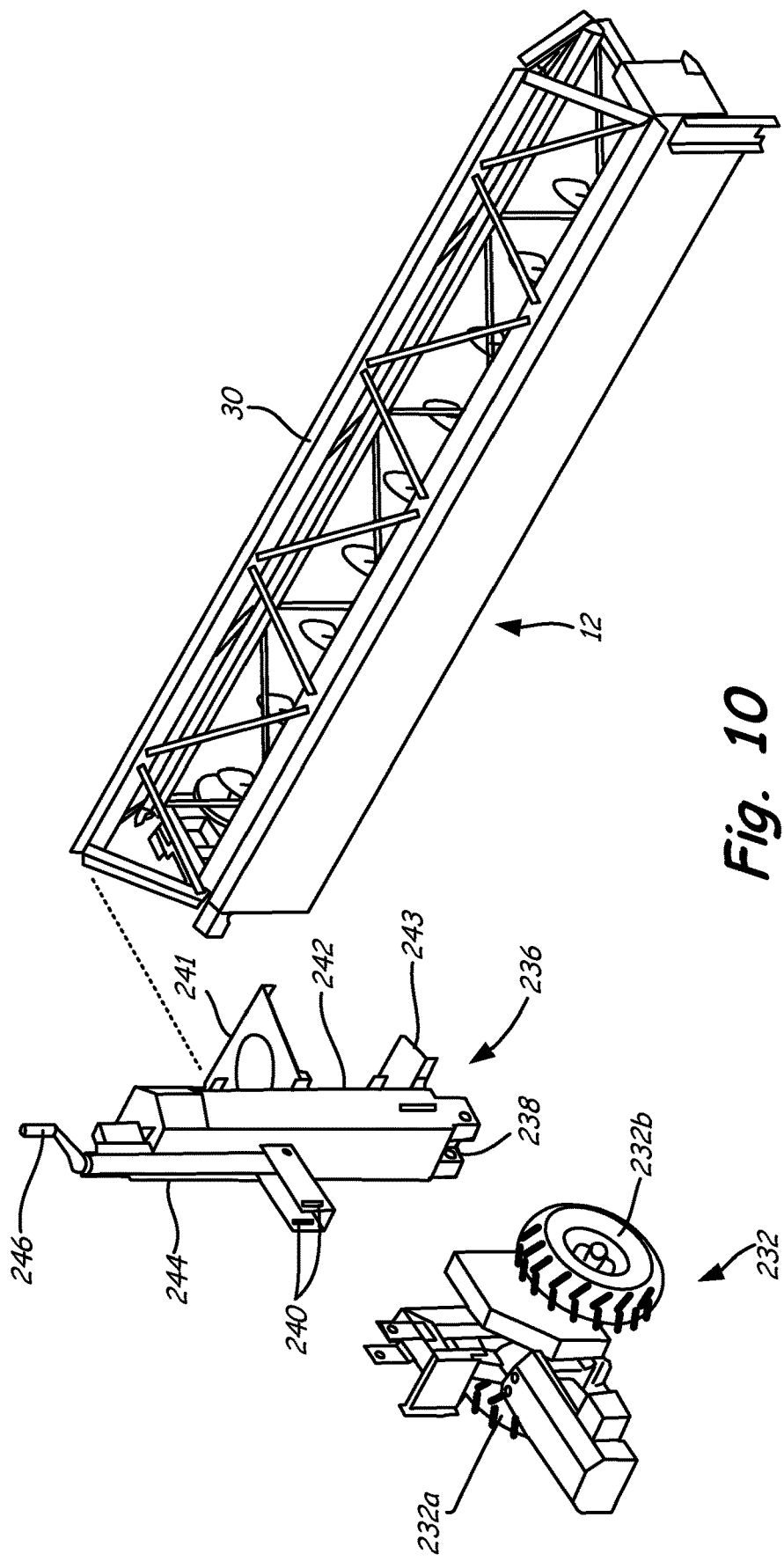
FIG. 10 is an exploded view of the components shown in FIG. 9.
Figure 11A:
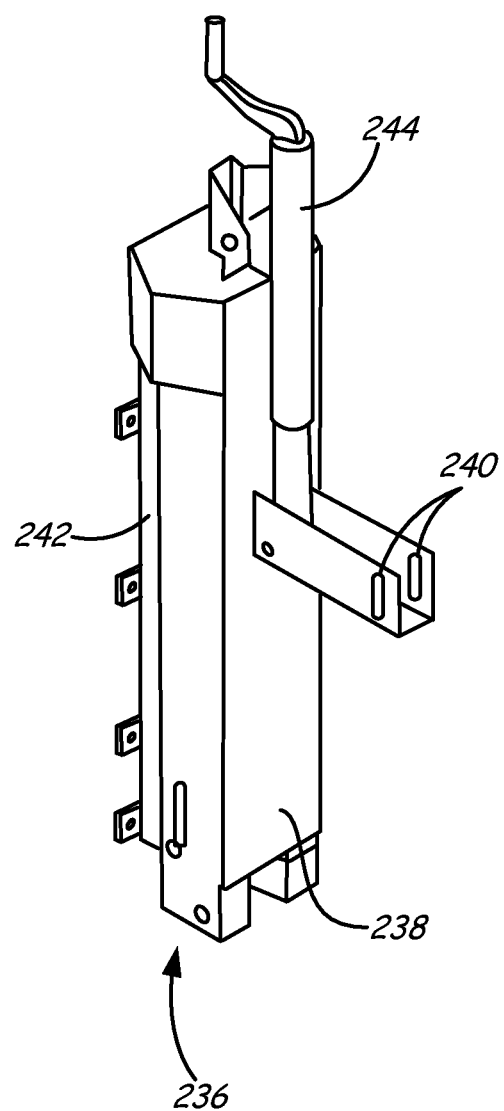
FIG. 11A is a perspective view of the spring-loaded weight-sensitive link of FIGS. 9 and 10.
Figure 11B:
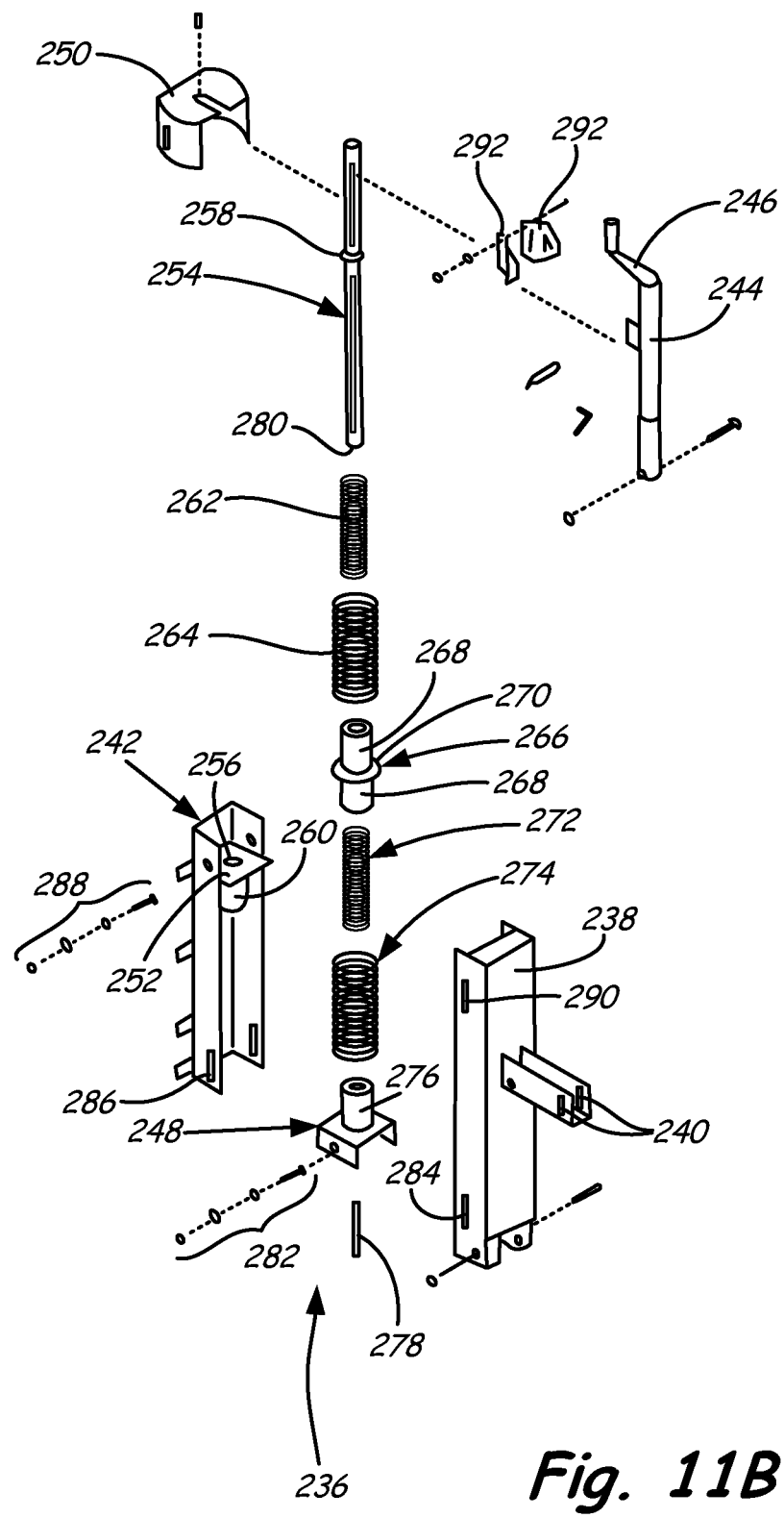
FIG. 11B is a perspective exploded view of the spring-loaded weight-sensitive link of FIGS. 9 and 10.

Bin sweep 12 has a tractor drive unit 32 to support a second end of bin sweep 12 and push sweep arm 30 radially around grain bin 14 on path 28 shown in FIG. 1. Various known designs of tractor drive units 32 can be used. For example, one tractor drive unit design is shown in FIGS. 4-6, while another tractor drive unit design is shown in FIGS. 9 and 10. As another example, a suitable tractor drive implementation is disclosed in commonly assigned U.S. Patent Application Publication 2005/0263372, which is hereby incorporated by reference.

Bin sweep 12 rotationally moves around a vertical, central pivot axis 16, such as along path 28. Bin sweep 12 conveys grain in the grain bin 14 from the outer circumference of grain bin 14 to center sump hopper 13 located at a floor opening 18, via such movement and via operation of its conveyor 31. Typically, floor opening 18 is centrally located within the grain bin 14. Upon reaching floor opening 18, the contents of the grain bin 14 drop into center sump hopper 13 and onto a conveyor 20 for transport out of grain bin 14. Typically, conveyor 20 is a screw auger within an enclosed tube, although any linear conveyor apparatus may suffice for this purpose. The conveyor 20 transports the stored grain to a discharge opening 22.

In an exemplary embodiment, a vertical adjustment assembly such as weight-sensitive link 36 is positioned between a floor support such as tractor drive unit 32 and bin sweep arm 30. In an exemplary embodiment, weight-sensitive link 36 is connected to tractor drive unit 32 and the bin sweep arm 30. Weight-sensitive link 36 automatically raises the bin sweep arm 30 off the floor surface 34 and automatically lowers the bin sweep arm 30 to the floor surface 34 in response to changes in weight disposed on the bin sweep arm 30.

Weight-sensitive link 36 between sweep arm 30 and tractor drive unit 32 of bin sweep 12 automatically lowers portions of bin sweep 12 to the floor when it is covered with a certain weight (such as the weight of grain, as seen in FIG. 2), thereby preventing damage to the wheels, axles and other components, and then automatically raises bin sweep 12 back up to operating position (for moving the remaining stored material 15 shown in FIGS. 3A and 3B) without any operator involvement. This eliminates the need for the operator to enter the bin 14, thereby eliminating the possibility of engulfment.

In an exemplary embodiment, weight-sensitive link 36 is inserted between a bin sweep arm 30 and tractor drive unit 32. Weight-sensitive link 36 assumes a default "up" position until a specified weight bearing down upon portions of the bin sweep is reached. After the specified weight is exceeded, weight-sensitive link 36 automatically moves bin sweep arm 30 to the "down" position. The weight bearing upon weight-sensitive link 36 is typically the weight of grain on top of the bin sweep structure or frame, but is not limited to that weight source. After the additional weight is removed, typically by using the gravity drain outlet at floor openings 18 and 21 to remove grain from the grain bin 14 by gravity, the weight-sensitive link 36 automatically returns to its "up" position, and bin sweep 12 is raised and ready to be used. While a single weight-sensitive link 36 is illustrated, such a weight-sensitive link 36 would typically be provided at multiple positions on bin sweep 12, typically wherever support between a bin sweep arm 30 and floor surface 34 is provided.

While FIGS. 1-3B show a single bin sweep arm 30 having a single floor support at tractor drive unit 32, it is to be understood that bin sweep arm 30 may include a plurality of linear sections connected end-to-end. Wherever bin sweep arm 30 is supported on floor surface 34 by a floor support such as a carrier wheel assembly (whether driven or not), such as between sections, weight-sensitive link 36 can be connected between the floor support and the bin sweep arm 30.

Weight-sensitive link 36 may operate automatically on a number of different principles, including the use of springs or hydraulics, for example. A first exemplary embodiment of a hydraulic weight-sensitive link 136 is shown in FIGS. 4-8. In an exemplary embodiment, hydraulic weight-sensitive link 136 includes a rear base 138 having rear attachment pin bores 140 (see FIGS. 7A-7C) to connect rear base 138 to the tractor drive unit 32, shown in FIGS. 4-6. A front base 142 connects to bin sweep arm 30. Manual jack 144 (see FIGS. 7A-7C), actuated by rotation of handle 146, controls a height of front base 142 (and therefore of bin sweep arm 30) with respect to the tractor drive unit 32, which rests upon floor surface 34 of grain bin 14 (via its tractor drive wheels 32a, 32b). While a jack 144 is illustrated, other height control, adjustment and setting devices are also contemplated, such as, for example, a threaded rod, linear actuator or the like.

As shown in FIG. 7A, jack 144 is retracted so that front base 142 and bin sweep arm 30 are on floor surface 34 of grain bin 14. FIG. 7B shows jack 144 in an extended position, thereby also extending hydraulic cylinder 148 (compare in FIGS. 7A and 7B the position of pin 145 in slot 147 of rear base 138). Thus, in FIG. 7B, bin sweep arm 30 connected to front base 142 is raised above floor surface 34, thereby providing the requisite clearance to allow bin sweep 12 to move across floor surface 34. In an exemplary embodiment, hydraulic cylinder 148 has a diaphragm-type hydraulic accumulator 150 attached to it. Accumulator 150 has a predetermined pressure setting, enabling hydraulic cylinder 148 to remain extended until a specified downward pressure or weight upon bin sweep arm 30 is detected. If the pressure or weight on bin sweep arm 30 increases (for example, due to a load of grain on top of the sweep arm 30) beyond the specified downward pressure or weight, hydraulic cylinder 148 will retract, as shown in FIG. 7C, thereby lowering bin sweep arm 30 to floor surface 34 even though jack 144 remains extended. When enough grain has been removed from grain bin 14 to so that the detected downward pressure/weight upon bin sweep arm 30 is less than specified downward pressure/weight of accumulator 150, then cylinder 148 extends automatically, thereby raising bin sweep arm 30 above floor surface 34, as shown in FIG. 7B.

To initially set hydraulic weight-sensitive link 136, hydraulic cylinder 148 is extended, filled with hydraulic fluid, and attached to a pre-charged hydraulic accumulator 150. Use of different accumulators allows an operator to vary the force required to automatically extend and retract hydraulic cylinder 148. Although an accumulator is shown, other arrangements for monitoring pressure/weight and triggering movement of link 36 are contemplated, such as a pressure-sensitive sensor. Thus set, hydraulic weight-sensitive link 136 will automatically extend and retract as shown in FIGS. 7B and 7C, depending upon the downward pressure/weight detected and carried by bin sweep 12. Under heavy loads, weight sensitive link 136 will assume the configuration shown in FIG. 7C to lower bin sweep arm 30 to the level of floor surface 34, thereby protecting bin sweep 12 from damage. When enough downward pressure/weight has been taken off bin sweep 12, weight-sensitive link 136 will automatically assume the configuration shown in FIG. 7B, thereby raising bin sweep arm 30 off the floor surface 34 to ready it for the grain sweeping function. Accordingly, hydraulic weight-sensitive link 136 provides an automatic means by which the bin sweep auger sections 30 are raised and lowered without requiring entry by an operator into the grain bin 14 beyond the initial installation and setting of hydraulic weight-sensitive link 136.

Figure 8:
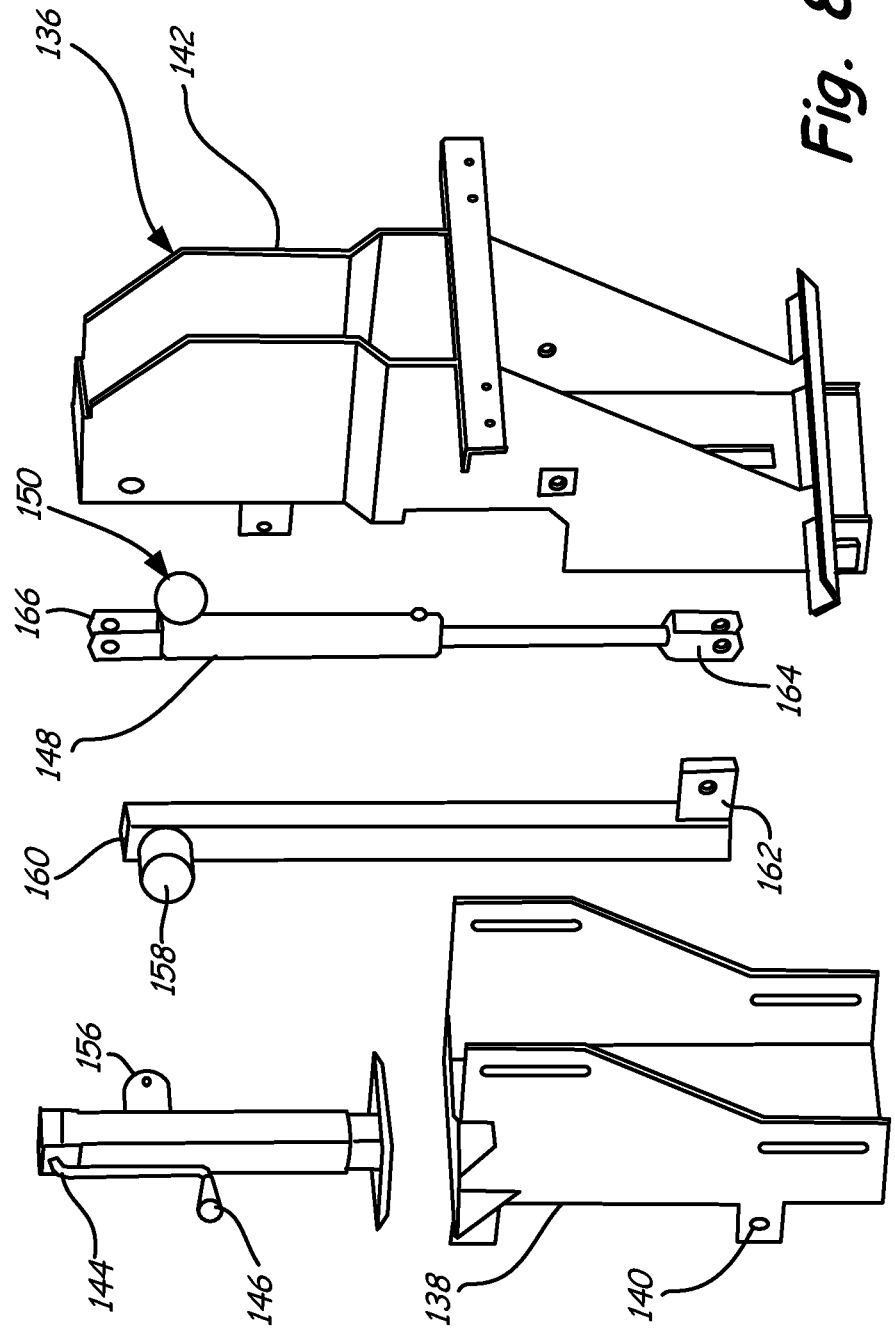
FIG. 8 is a front perspective exploded view of the hydraulic weight-sensitive link of FIGS. 7A-7C.

FIG. 8 shows an exploded view of hydraulic weight-sensitive link 136, with some parts removed for clarity. Base 152 of jack 144 is attached to top plate 154 of rear base 138. Stub 156 of jack 144 is inserted into sleeve 158 of link 160. A pin (not shown) connects lower end 162 of link 160 to lower end 164 of cylinder 148. Upper end 166 of cylinder 148 is connected to front base 142.

In a second exemplary embodiment, a spring-loaded weight-sensitive link 236 is shown in FIGS. 9-11B. In an exemplary embodiment, spring-loaded weight-sensitive link 236 includes rear base 238 having rear attachment pin bores 240 for the receipt of pins (not shown) to connect rear base 238 to the tractor drive unit 232. A front base 242 connects to bin sweep arm 30 via brackets 241 and 243, shown in FIGS. 9 and 10. Most of the components of spring-loaded weight-sensitive link 236 are enclosed between rear base 238 and front base 242 and enclosed at the bottom and top ends by lower spring mount 248 and top cover 250, respectively.

Upper spring mount 252 is fixedly provided within front base 242. In an exemplary method of assembling spring-loaded weight-sensitive link 236, lift tube 254 is inserted (from above) into bore 256 of upper spring mount 252 until flange 258 of lift tube 254 contacts upper spring mount 252 and can be inserted downwardly no further. Upper inner spring 262 is slid upward on lift tube 258 and into tube 260 of upper spring mount 252. Upper outer spring 264 is then slid upward on lift tube 254 and around tube 260 of upper spring mount 252. Center spring mount 266, having tube 268 and flange 270, is then slid upward onto lift tube 254. Center spring mount 266 has a divider therein that contacts the bottom of upper inner spring 262. A bore within the divider allows the passage of lift tube 258 but not upper inner spring 262. Tube 268 of center spring mount 266 is inserted into a bottom of upper outer spring 264 until flange 270 contacts the bottom surface of upper outer spring 264.

In an exemplary method of assembling spring-loaded weight-sensitive link 236, lower inner spring 272 and lower outer spring 274 are assembled onto lift rod 254. A top of lower inner spring 272 is inserted into tube 268 until it reaches the divider in the middle of center spring mount 266. Lower outer spring 274 is slid onto lower inner spring 272 on an outside of tube 268, until an upper end of lower outer spring 274 contacts flange 270. Thereafter, lower spring mount 248 is assembled so that the lower end of lower inner spring 272 resides within tube 276 of lower spring mount 248 and a lower end of lower outer spring 274 is disposed around tube 276. Externally threaded bolt 278 is passed through tube 276 from the bottom of lower spring mount 248 to connect with an internally threaded bore 280 at a bottom end of lift tube 254, thereby fixing left tube 254 to lower spring mount 248.

Bolt 278 and threaded bore 280 of lift tube 254 are then threaded together to compress the springs 262, 264, 272 and 274 to a desired initial amount of force. In an exemplary embodiment, the spring assembly has a relaxed length of about 32 inches and is compressed to a compressed length of about 25 inches. In another embodiment, the springs are not initially compressed. In the illustrated embodiment, two sets of double springs (inner and outer springs) are used to obtain the desired amount of spring force in a limited linear space. However, it is to be understood that other spring configurations can also be used. For example, while upper and lower inner and outer springs are shown, it is to be understood that the upper and lower springs can instead be replaced by a longer spring. Center spring mount 266 is a centering device that prevents the springs 262, 264, 272 and 274 from buckling sideways.

Pin assembly 282 allows lower spring mount 248 to move relative to rear base 238 and front base 242 by traveling within slots 284 and 286, respectively. Pin assembly 288 attaches front base 242 to rear base 238 and allows for vertical movement of front base 242 at upper slots 290 of rear base 238. Manual jack 244 is connected to lift tube 254 via jack lift plates 292. Thus, when jack 244 is actuated by rotating handle 246, lift tube 254 moves vertically, along with the spring assembly connected to it between flange 258 and threaded bore 280.

In exemplary installation, spring-loaded weight-sensitive link 236 is connected between bin sweep 12 and tractor drive unit 232 so that bin sweep 12, which is connected to front base 242 rests on a floor surface when there is no load on it. In that situation, pin assembly 282 is disposed at the bottom of slots 284 and 286; at the same time, pin assembly 288 is disposed at a bottom of slot 290. To raise bin sweep 12 above a floor surface, jack handle 246 is rotated so that jack 244 raises lift tube 254. This in turn lifts lower spring mount 248 so that pin assembly 282 moves to an upper portion of slot 284 and pin assembly 288 moves to an upper portion of slot 290. As long as the force (the downward pressure/weight of grain on bin sweep 12) exerted on front base 242 is less than the initial spring compression force, jack 244 thereby lifts front base 242, and thereby bin sweep arm 30, relative to rear base 238 which is connected to a floor supporting unit such as tractor drive unit 232 (via its wheels 232a, 232b).

The force experienced by front base 242 will increase as bin sweep 12 supports additional grain weight and its corresponding downward pressure. When such force increases beyond the initial spring compression force, further compression of the springs will cause front base 242 to move down relative to rear base 238, thereby lowering bin sweep 12 to the floor. In this case, pin assembly 282 remains at an upper portion of slot 284, which means that the jack 244 is extended. However, spring compression causes pin assembly 282 to move upward in slot 286 while pin assembly 288 moves downward in slot 290. Accordingly, bin sweep 12 rests on the floor even though jack 244 is extended.

When the extra force (i.e. the grain downward pressure/weight) is removed, the springs will again extend, thereby lifting front base 242 and the attached bin sweep arm 30. The amount of travel of pin assemblies 282 and 288 within slots 284, 286 and 290 is limited by the length of slots 284, 286 and 290. In an exemplary embodiment, that amount of travel is about four inches.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A weight-sensitive link apparatus configured for use with a bin sweep arm and a floor support that is in contact with a floor surface, the apparatus including:
    a first portion configured for attachment to the floor support; and
    a second portion configured for attachment to the bin sweep arm,
    wherein the apparatus has a first configuration in which the second portion is raised relative to the first portion and a second configuration in which the second portion is lowered relative to its position in the first configuration, and wherein the apparatus automatically moves from the first configuration to the second configuration in response to downward pressure on the bin sweep arm that exceeds a predetermined pressure setting.

2. The apparatus of claim 1 wherein the apparatus automatically moves from the second configuration to the first configuration in response to a decrease in the downward pressure on the bin sweep arm.

3. The apparatus of claim 1 including a height adjustment device configured to control a height of the second portion relative to the floor surface in the first configuration.

4. The apparatus of claim 3 wherein the height adjustment device is a jack.

5. The apparatus of claim 4 wherein the jack is manually acutable.

6. The apparatus of claim 1 including a hydraulic cylinder.

7. The apparatus of claim 6, wherein the hydraulic cylinder is in an extended configuration when the apparatus is in the first configuration.

8. The apparatus of claim 7, wherein the hydraulic cylinder is in a retracted configuration when the apparatus is in the second configuration.

9. The apparatus of claim 1 including an accumulator having the predetermined pressure setting.

10. The apparatus of claim 1 including a first spring.

11. The apparatus of claim 10 including a second spring.

12. The apparatus of claim 11 wherein at the first spring concentrically surrounds the second spring.

13. The apparatus of claim 11 including a center spring mount disposed intermediate the first spring and the second spring.

14. The apparatus of claim 10 wherein the first spring is initially compressed.

15. The apparatus of claim 10 including a lift rod.

16. The apparatus of claim 1 further including:
an upper spring mount;
a lower spring mount; and a
lift tube;
wherein the first spring is disposed between the upper spring mount and the lower spring mount and wherein the first spring surrounds the lift tube.

* * * * *